(12) United States Patent
Ye et al.

(10) Patent No.: US 12,513,717 B2
(45) Date of Patent: Dec. 30, 2025

(54) MECHANISMS FOR USER EQUIPMENT BEAM PAIRING ON SIDELINK COMMUNICATION

(71) Applicant: Apple Inc., Cupertino, CA (US)

(72) Inventors: Chunxuan Ye, San Diego, CA (US); Yushu Zhang, Beijing (CN); Dawei Zhang, Saratoga, CA (US); Haitong Sun, Cupertino, CA (US); Weidong Yang, San Diego, CA (US); Wei Zeng, Saratoga, CA (US); Huaning Niu, San Jose, CA (US); Hong He, San Jose, CA (US); Oghenekome Oteri, San Diego, CA (US); Chunhai Yao, Beijing (CN)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 18/109,046

(22) Filed: Feb. 13, 2023

(65) Prior Publication Data

US 2023/0300863 A1    Sep. 21, 2023

Related U.S. Application Data

(60) Provisional application No. 63/320,966, filed on Mar. 17, 2022.

(51) Int. Cl.
*H04W 72/40* (2023.01)
*H04W 72/044* (2023.01)
(Continued)

(52) U.S. Cl.
CPC ......... *H04W 72/40* (2023.01); *H04W 72/046* (2013.01); *H04W 72/542* (2023.01); *H04W 92/18* (2013.01)

(58) Field of Classification Search
CPC . H04W 72/40; H04W 72/542; H04W 72/046; H04W 92/18
See application file for complete search history.

(56) References Cited

U.S. PATENT DOCUMENTS

2018/0206132 A1\* 7/2018 Guo ..................... H04W 16/28
2020/0382195 A1\* 12/2020 Hur ..................... H04B 7/0617
(Continued)

OTHER PUBLICATIONS

International Search Report for Application No. PCT/US2023/064334 mailed Jun. 5, 2023, 16 pages.
(Continued)

*Primary Examiner* — Mewale A Ambaye
(74) *Attorney, Agent, or Firm* — Sterne, Kessler, Goldstein & Fox P.L.L.C.

(57) ABSTRACT

Some aspects of this disclosure relate to apparatuses and methods for implementing a beam pairing procedure between a transmission UE and a receiver UE. The transmission UE and the receiver UE can configure a set of beam patterns to be used in the beam pairing procedure. The set of beam patterns can include one or more transmission beams of the UE, and one or more receiving beams of the receiver UE. The transmission UE can transmit one or more sidelink reference signals to the receiver UE, and the receiver UE can perform signal strength measurements of the one or more sidelink reference signals. Based on the signal strength measurements, either the transmission UE or the receiver UE can make the selection of the transmission beam and the corresponding receiving beam for the beam pairing procedure.

20 Claims, 8 Drawing Sheets

(51) Int. Cl.
*H04W 72/542* (2023.01)
*H04W 92/18* (2009.01)

(56) References Cited

U.S. PATENT DOCUMENTS

| | | | | |
|---|---|---|---|---|
| 2021/0045103 | A1* | 2/2021 | Kim | H04W 4/70 |
| 2021/0160850 | A1* | 5/2021 | Akkarakaran | H04W 76/14 |
| 2021/0321343 | A1* | 10/2021 | Ryu | H04W 56/0025 |
| 2021/0329699 | A1* | 10/2021 | Zhou | H04B 7/088 |
| 2021/0360433 | A1* | 11/2021 | Sakhnini | H04W 72/53 |
| 2024/0064724 | A1* | 2/2024 | Zhu | H04B 7/04026 |
| 2024/0381116 | A1* | 11/2024 | Li | H04W 16/28 |

OTHER PUBLICATIONS

3GPP TS 38.212 V17.0.0 (Dec. 2021), 3rd Generation Partnership Project; Technical Specification Group Radio Access Network; NR; Multiplexing and channel coding (Release 17); 190 pages.
3GPP TS 38.213 V17.0.0 (Dec. 2021), 3rd Generation Partnership Project; Technical Specification Group Radio Access Network; NR; Physical layer procedures for control (Release 17); 225 pages.
3GPP TS 38.214 V17.0.0 (Dec. 2021), 3rd Generation Partnership Project; Technical Specification Group Radio Access Network; NR; Physical layer procedures for data (Release 17); 217 pages.

\* cited by examiner

MECHANISMS FOR USER EQUIPMENT BEAM PAIRING ON SIDELINK COMMUNICATION

CROSS REFERENCES

This application claims the benefit of U.S. Provisional Application No. 63/320,966 filed Mar. 17, 2022, titled "Mechanisms for user equipment beam pairing on sidelink communication," the content of which is herein incorporated by reference in its entirety.

BACKGROUND

Field

The described aspects generally relate to managing user equipment beam pairing on sidelink communication in a wireless communication system.

Related Art

A user equipment (UE) communicates with a base station (for example, an evolved Node B (eNB), a next generation node B (gNB), or other base station) in a wireless communication network or system. In addition, device-to-device (D2D) or sidelink communication among UEs is becoming more and more important for information exchange in wireless communication systems. Sidelink communication enables direct communication between proximate devices, e.g., multiple UEs, without going through the base station, leading to lower latency for communication among UEs. However, there are various issues to be resolved for sidelink communication among UEs in a wireless communication system.

SUMMARY

Some aspects of this disclosure relate to apparatuses and methods for implementing device-to-device (D2D) or sidelink communications among multiple user equipments (UEs) in wireless communication systems, e.g., a wireless communication system based on 3rd Generation Partnership Project (3GPP) release 16 (Rel-16), release 17 (Rel-17), or others. For example, systems and methods are provided implementing designs for New Radio (NR) wireless systems.

Some aspects of this disclosure relate to a UE. The UE, which may be a transmission UE, includes a transceiver and a processor communicatively coupled to the transceiver. The transceiver is configured to wirelessly communicate through an interface for sidelink communication with one or more UEs including a receiver UE. The processor configures a set of beam patterns to be used in a beam pairing procedure between the transmission UE and the receiver UE. The set of beam patterns can include one or more transmission beams of the UE, and one or more receiving beams of the receiver UE.

The processor can further be configured to transmit, using one or more beam patterns of the set of beam patterns, one or more sidelink reference signals to the receiver UE, and receive a message from the receiver UE. In some examples, the one or more sidelink reference signals are carried using a physical sidelink shared channel (PSSCH) that carries data information. The message may contain information related to signal strength measurements on the one or more beam patterns based on the one or more sidelink reference signals. Based on the received message, the processor can further be configured to determine a selected transmission beam selected from the one or more transmission beams of the UE for signal transmissions from the UE to the receiver UE. Afterwards, the processor is further configured to transmit data from the UE to the receiver UE using the selected transmission beam. In some examples, the UE can further be configured to receive a beam pairing request from the receiver UE before transmitting the one or more sidelink reference signals to the receiver UE.

In some examples, the one or more sidelink reference signals includes a sidelink (SL) channel state information reference signal (CSR-RS), and the signal strength measurements performed on the one or more beam patterns based on the one or more sidelink reference signals include a Reference Signal Receive Power (RSRP) measurement, a Reference Signal Received Quality (RSRQ), or a Signal to Interference & Noise Ratio (SINR).

In some examples, the message received from the receiver UE contains an identifier of the selected transmission beam selected by the receiver UE. In some other examples, the message received from the receiver UE contains the information related to the signal strength measurements on the one or more beam patterns based on the one or more sidelink reference signals. To determine the selected transmission beam, the processor is configured to select the selected transmission beam of the UE and a related receiving beam of the receiver UE based on the information related to the signal strength measurements on the one or more beam patterns based on the one or more sidelink reference signals. Afterwards, the processor is configured to transmit an indication to the receiver UE to indicate the selected transmission beam and the related receiving beam of the receiver UE. The indication to indicate the selected transmission beam and the related receiving beam includes a quasi-co-location (QCL) indication.

Some aspects of this disclosure relate to a UE and a method performed by a UE. The UE, which may be a receiver UE, includes a transceiver and a processor communicatively coupled to the transceiver. The method performed by the receiver UE may include configuring a set of beam patterns to be used in a beam pairing procedure, where the set of beam patterns includes one or more receiving beams of the UE, and one or more transmission beams of a transmission UE. The method may further include receiving, using one or more beam patterns of the set of beam patterns, one or more sidelink reference signals from the transmission UE, where the one or more sidelink reference signals may be carried by a PSSCH that carries data information. Afterwards, the method can include performing signal strength measurements of the one or more sidelink reference signals.

In some examples, the one or more sidelink reference signals includes a sidelink (SL) channel state information reference signal (CSR-RS), and the signal strength measurements of the one or more sidelink reference signals include a Reference Signal Receive Power (RSRP) measurement, a Reference Signal Received Quality (RSRQ), or a Signal to Interference & Noise Ratio (SINR).

In some examples, the method may further include transmitting a message to the transmission UE, where the message may contain information related to the signal strength measurements of the one or more sidelink reference signals. In some examples, the message may be transmitted by a physical sidelink feedback channel (PSFCH). The method may further include determining a selected receiving beam selected from the one or more receiving beams of the UE for receiving signal transmissions from the transmission UE.

In some examples, the method may further include determining a selected transmission beam selected from the one or more transmission beams of the transmission UE, where the message transmitted to the transmission UE contains an identifier of the selected transmission beam. The identifier of the selected transmission beam includes a slot index, or a resource identifier of the one or more sidelink reference signals.

In some examples, the message transmitted to the transmission UE can contain the information related to the signal strength measurements, and the method further comprising receiving a message from the transmission UE that includes an indication of the selected receiving beam selected from the one or more receiving beams of the UE by the transmission UE.

In some examples, the method may further include transmitting a beam pairing request from the UE before receiving the one or more sidelink reference signals from the transmission UE. The transmitting the beam pairing request may be triggered by a timer or an event, and the beam pairing request may be contained in a medium access control (MAC) control element (CE) or sidelink control information (SCI) stage 2.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings.

In the drawings, generally, like reference numbers indicate identical or functionally similar elements. Additionally, generally, the left-most digit(s) of a reference number identifies the drawing in which the reference number first appears.

DETAILED DESCRIPTION

In a wireless system, a user equipment (UE) can communicate via uplink and downlink with a base station (for example, an evolved Node B (eNB), a next generation node B (gNB), or other base station) in a wireless communication network or system. In addition, a UE can communicate with one or more UEs directly by device-to-device (D2D) or sidelink (SL) communication through sidelink channels. Various sidelink channels are defined in an interface for sidelink communication, e.g., Physical Sidelink Control Channel (PSCCH) and physical sidelink shared channel (PSSCH) in a PC5 interface. Compared to the conventional cellular communication, sidelink communication can have many advantages, e.g., more efficient and transparent to achieve higher spectral efficiency and low latency. Other terms have been used to describe SL related communication systems, e.g., proximity service (ProSe) communication, D2D communication. Even though those terms, e.g., SL communication, D2D communication, ProSe communication, can differ from each other in some aspects. In the current disclosure, SL, D2D, and ProSe are used interchangeably. SL communication can operate using both licensed cellular spectrum (known as in-band communication) and unlicensed spectrum (known as out-band communication).

According to some aspects, in a wireless system, a UE can include an antenna having a plurality of antenna panels, where an antenna panel can include an array of antenna elements that can be located in close physical location. In some examples, an antenna can be a smart antenna system, where all antenna elements are considered as pseudo-omni or quasi-sector-omni antenna elements including a phase shifter. A directional beam, such as a transmission (TX) beam or a receiving (RX) beam, can be formed by adjusting the phase shifter of the antenna element. According to some aspects, for sidelink communication between multiple UEs, a transmission UE can have multiple TX beams such as N TX beams, and a receiver UE can have multiple RX beams such as M TX beams.

According to some aspects, in a wireless system, a TX/RX beam pairing operation or procedure may be performed between a transmission UE and a receiver UE so that data communication between the transmission UE and the receiver UE can happen. During the beam pairing operation or procedure, a specific or selected transmission beam is selected from the multiple transmission beams of the transmission UE, and a selected receiving beam is selected from the multiple receiving beams of the receiver UE, so that data are transmitted between the transmission UE and the receiver UE using the selected transmission beam and the selected receiving beam.

However, various technical problems may occur during the beam pairing procedure between a transmission UE and a receiver UE for sidelink communication. Performing the beam pairing procedure by broadcasting operations among all the UEs in the communication range can be inefficient in terms of resource overhead or power consumption of the UE. In the unicast based beam pairing procedure, operations based on some limited types of sidelink reference signals and signal strength measurements of the one or more sidelink reference signals are performed. For example, some systems may only provide a channel state information reference signal configured by PC5-RRC configuration, and the measurement of the reference signals may be limited to a channel quality indicator. In addition, the procedures performed between the transmission UE and the receiver UE may be inefficient and not flexible.

Some aspects of this disclosure provide improved solutions to a TX/RX beam pairing procedure performed between a transmission UE and a receiver UE for sidelink communication. A UE can either perform the function of a transmission UE or a receiver UE. Accordingly, a UE can be either a transmission UE or a receiver UE. The beam pairing procedure presented herein can have the flexibility that either the transmission UE or the receiver UE can initialize the beam pairing procedure, and the selected transmission beam or the selected receiving beam can be determined by either the transmission UE or the receiver UE. In addition, the selection of the TX/RX beam pair can be performed among a set of beam patterns to be used in a beam pairing procedure, which may be a smaller subset of all the possible N*M beam pairs between the N TX beams of the transmission UE and the M RX beams of the receiver UE. The set of beam patterns can be configured on both the transmission UE and the receiver UE. Since the set of beam patterns is smaller than all the possible N*M beam pairs, the efficiency for the selection of the beam pair can be improved.

The UEs disclosed herein can operate in a wireless communication system based on 3rd Generation Partnership Project (3GPP) release 16 (Rel-16), release 17 (Rel-17), or a New Radio (NR) system. However, these 3GPP release versions are not meant to be limiting. Although some examples of the contents of SL communication among multiple UEs are provided above, the aspects of this disclosure are not limited to these examples and SL communication among multiple UEs can include less, more, or other parameters, instructions, and/or information.

Figure 1:
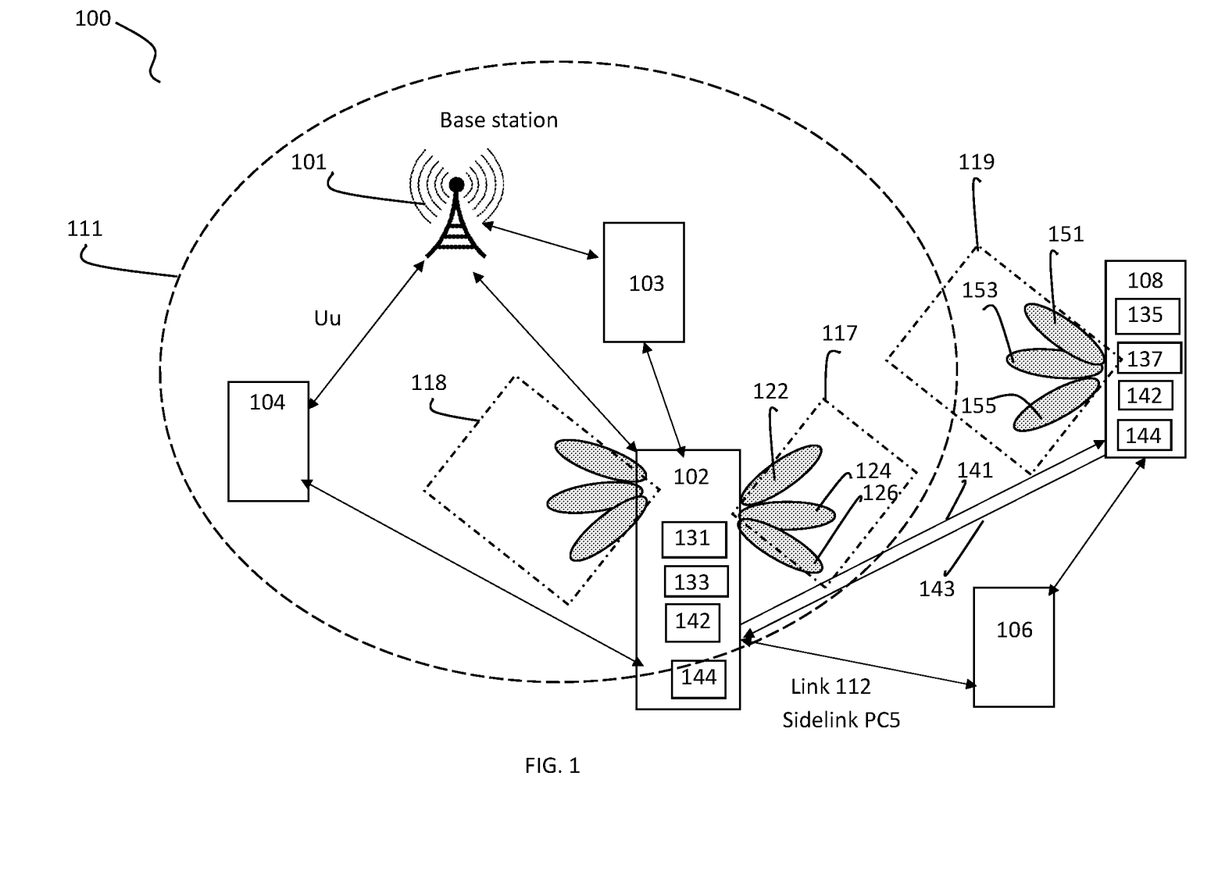
FIG. 1 illustrates an example wireless system implementing designs for sidelink communications among multiple user equipments (UEs), according to some aspects of the disclosure.

FIG. 1 illustrates an example wireless network 100 implementing designs for sidelink communications among multiple UEs, according to some aspects of the disclosure. The wireless system 100 is provided for the purpose of illustration only and does not limit the disclosed aspects. The system 100 can include, but is not limited to, a network node (herein referred to as a base station) 101 and multiple UEs, e.g., a UE 102, a UE 103, a UE 104, a UE 106, a UE 108.

According to some aspects, the base station 101 can include a node configured to operate based on a wide variety of wireless communication techniques such as, but not limited to, techniques based on 3GPP standards. For example, base station 101 can include a node configured to operate using Rel-16, Rel-17, or others. The base station 101 can be a fixed station, and may also be called a base transceiver system (BTS), an access point (AP), a transmission/reception point (TRP), an evolved NodeB (eNB), a next generation node B (gNB), or some other equivalent terminology. The system 100 can operate using both licensed cellular spectrum (known as in-band communication) and unlicensed spectrum (known as out-band communication).

According to some aspects, a UE, e.g., the UE 102, the UE 103, the UE 104, the 106, or the UE 108, can be configured to operate based on a wide variety of wireless communication techniques. These techniques can include, but are not limited to, techniques based on 3rd Generation Partnership Project (3GPP) standards. For example, referring to FIG. 1, the UE 102 can be configured to operate using Rel-16, Rel-17 or later. UE 102, UE 103, UE 104, UE 106, or UE 108, can include, but is not limited to, a wireless communication device, a smart phone, a laptop, a desktop, a tablet, a personal assistant, a monitor, a television, a wearable device, an Internet of Things (IoTs), a vehicle's communication device, a mobile station, a subscriber station, a remote terminal, a wireless terminal, a user device, or the like.

According to some aspects, base station 101 communicates with the multiple UEs within a coverage area 111, e.g., UE 102, UE 104, UE 103, while UE 106 and UE 108 are outside the coverage area 111. Among them, UE 103 is a relay UE. A UE within the coverage area 111, e.g., UE 102, communicates with the base station 101 in uplink (UL) and downlink (DL) through a communication interface, e.g., a Uu interface.

According to some aspects, a UE can perform SL communication with another UE. For example, UE 102 can perform SL communication with UE 104, UE 106, and UE 108. UE 104 is an in-coverage UE with respect to UE 102 and base station 101 since both UE 102 and UE 104 are within coverage area 111 of base station 101. UE 106 is a partial-coverage UE with respect to UE 102 and base station 101 since UE 106 is outside coverage area 111 but UE 102 is within coverage area 111 and operates a link 112 with UE 102. Furthermore, UE 106 can perform SL communication with UE 108, where both UE 106 and UE 108 are an out-of-coverage UE since both UE 106 and UE 108 are out of coverage area 111 of base station 101.

According to some aspects, a UE can perform SL communication with another UE over a SL link through an interface, e.g., PC5 interface, which is different from the interface between the UE and the base station. The interface for SL communication between UEs can support one-to-many and/or any-to-any communication between a group of UEs. For example, UE 102 and UE 106 can communicate over link 112 through the PC5 interface. A message can be sent from UE 102 to UE 106 using SL communication by a broadcast transmission, a groupcast transmission, or a unicast transmission.

According to some aspects, a UE can perform SL communication with another UE for various applications. For example, UE 102 can perform SL communication with UE 106 for public safety use or commercial application, to provide a data offloading facility that can reduce the overall network overhead, for indoor installation and positioning, for machine type communication (MTC), or more. UE 102 can perform vehicle-to-vehicle (V2V) communication and vehicle-to-everything (V2X) communication with UE 106 by SL communication. For example, UE 102 and UE 106 can be two vehicles. UE 102 can be a vehicle running at high speed that warns UE 106, which is a nearby vehicle, using link 112 before it changes highway lanes.

According to some aspects, UE 102 can include an antenna having a plurality of antenna panels, e.g., an antenna panel 117, and an antenna panel 118. In general, an antenna can include one or more antenna panels. An antenna panel can include an array of antenna elements that can be located in close physical location. Any antenna element, can be an omnidirectional antenna element, a quasi-omnidirectional antenna element, a directional antenna element, or any other antenna element. In some examples, antenna can be a smart antenna system, where all antenna elements are considered as pseudo-omni or quasi-sector-omni antenna elements including a phase shifter. A directional beam, such as such as a TX beam or a RX beam, can be formed by adjusting the phase shifter of the antenna element. Accordingly, antenna panel 117 can provide corresponding antenna beam (herein "beam") 122, beam 124, beam 126. And antenna panel 119 can provide beam 151, beam 153, or beam 155, which can either be a transmission beam or a receiving beam. Antenna panel 117, antenna panel 118, and antenna panel 119 are only shown as examples. In some examples, there can be more or fewer antenna panels, and an antenna panel can include 2, 4, 8, 16, or other number of antenna elements, which can include a dipole antenna element, a monopole antenna element, a patch antenna element, a loop antenna element, a microstrip antenna element, or any other type of antenna elements suitable for transmission of RF signals.

According to some aspects, UE 102 can include a transceiver 131 and a processor 133 communicatively coupled to transceiver 131. Transceiver 131 can be configured to wirelessly communicate through an interface for sidelink communication with one or more UEs including a receiver UE, such as UE 108. According to some aspects, processor 133 can configure a set of beam patterns 142 to be used in a beam pairing procedure between a transmission UE and a receiver UE. When UE 102 functions as a transmission UE, processor 133 can transmit one or more sidelink reference signals 141 to the receiver UE, and receive a message 143 from the receiver UE. When UE 102 functions as a receiver UE, processor 133 can perform signal strength measurements 144 of the one or more sidelink reference signals. Other UEs, such as UE 104, UE 106, UE 108 can have a structure similar to UE 102. UE 108 can include a transceiver 135 and a processor 137, which may perform similar functions as transceiver 131 and processor 133.

Figure 2:
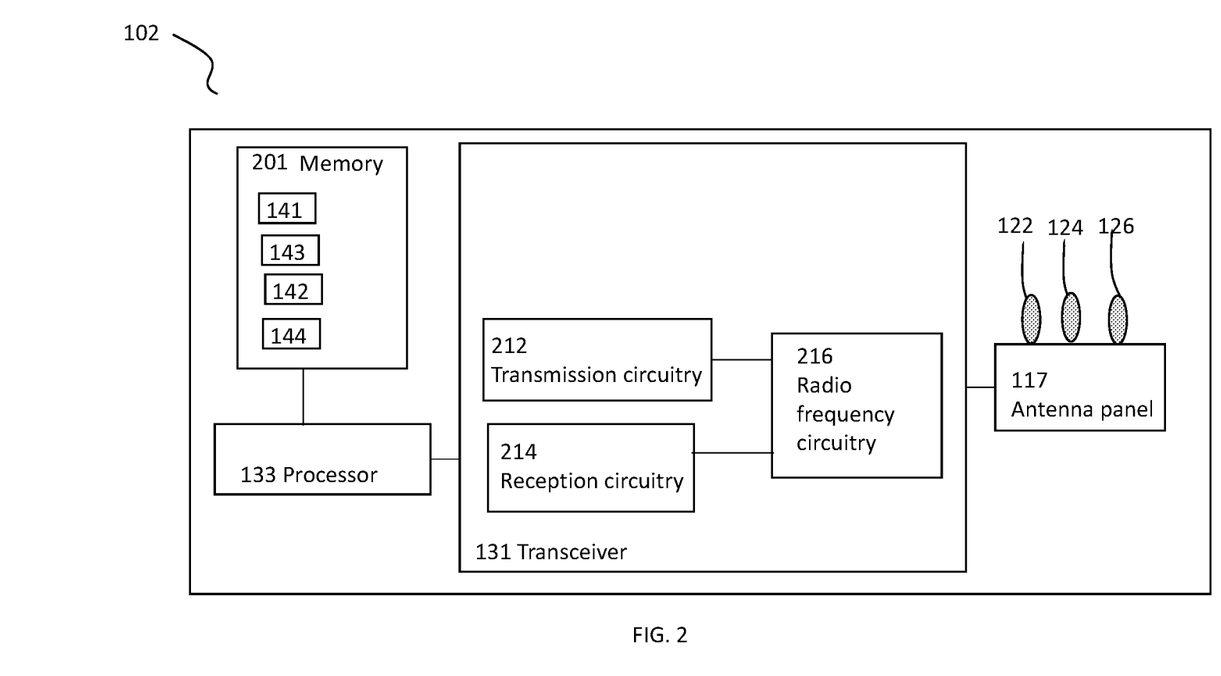
FIG. 2 illustrates a block diagram of a UE implementing a beam pairing procedure for sidelink communications, according to some aspects of the disclosure.

According to some aspects, UE 102, or any other UE can be implemented according to a block diagram as illustrated in FIG. 2.

Referring to FIG. 2, UE 102 can have antenna panel 117 including one or more antenna elements to form various beams, e.g., beam 122, beam 124, or beam 126, coupled to transceiver 131 and controlled by processor 133. Transceiver 131 and antenna panel 117 can be configured to enable wireless communication in a wireless network, such as wireless network 100, including wireless communication with UE 108 and base station 101. In detail, transceiver 113 can include radio frequency (RF) circuitry 216, transmission circuitry 212, and reception circuitry 214 to enable wireless communication with other UEs and/or a base station as discussed for wireless network 100. RF circuitry 216 can include multiple parallel RF chains for one or more of transmit or receive functions, each connected to one or more antenna elements of the antenna panel. In addition, processor 133 can be communicatively coupled to a memory 201, which are further coupled to the transceiver 131. Various data can be stored in memory 201.

In some examples, memory 201 can store one or more sidelink reference signals 141, message 143, or signal strength measurements 144. Memory 201 can store the set of beam patterns 142 to be used in a beam pairing procedure. The set of beam patterns 142 can include one or more transmission beams of the UE, and one or more receiving beams of the receiver UE. As shown in FIG. 1, UE 102 can generate beam 122, beam 124, beam 126, and UE 108 can generate beam 151, beam 153, and beam 155. In theory, there could be 3*3 different beam pairs for data communication between UE 102 and UE 108. However, the number of beams is not limited to this 3*3 construct. A transmission beam can be selected from beam 122, beam 124, and beam 126, while a receiving beam can be selected from beam 151, beam 153, and beam 155. The total 3*3=9 possible pairs of a transmission beam and a receiving beam can be represented as A={(122, 151), (124, 151), (126, 151), (122, 153), (124, 153), (126, 153), (122, 155), (124, 155), (126, 155)}. To reduce the candidates for the selection of a pair of a transmission beam and a receiving beam, the set of beam patterns 142 can be a subset of the set of all possible pairs of a transmission beam and a receiving beam. For example, the set of beam patterns 142 can be subset B={(122, 151), (124, 151), (122, 155), (124, 155), (126, 155)}, which is a subset of all possible beam patterns A. Since the set of beam patterns 142 may be smaller than all the possible N*M beam pairs, the efficiency for the selection of the beam pair can be improved.

Based on the discussion herein, it will apparent that the other UEs 103, 104, 106, and 108 in FIG. 1 can have a same or similar structure to that described for UE 102 in FIG. 2.

In some embodiments, memory 201 can store instructions, that when executed by processor 133 perform or cause to perform operations described herein, e.g., operations to perform a beam pairing procedure for sidelink communications. Alternatively, processor 133 can be "hard-coded" to perform the operations described herein. In some embodiments, processor 133 can be configured to perform operations described for FIG. 3A when UE 102 functions as a transmission UE or FIG. 3B when UE 102 functions as a receiver UE, as will be understood by one skilled in the art.

Figure 3A:
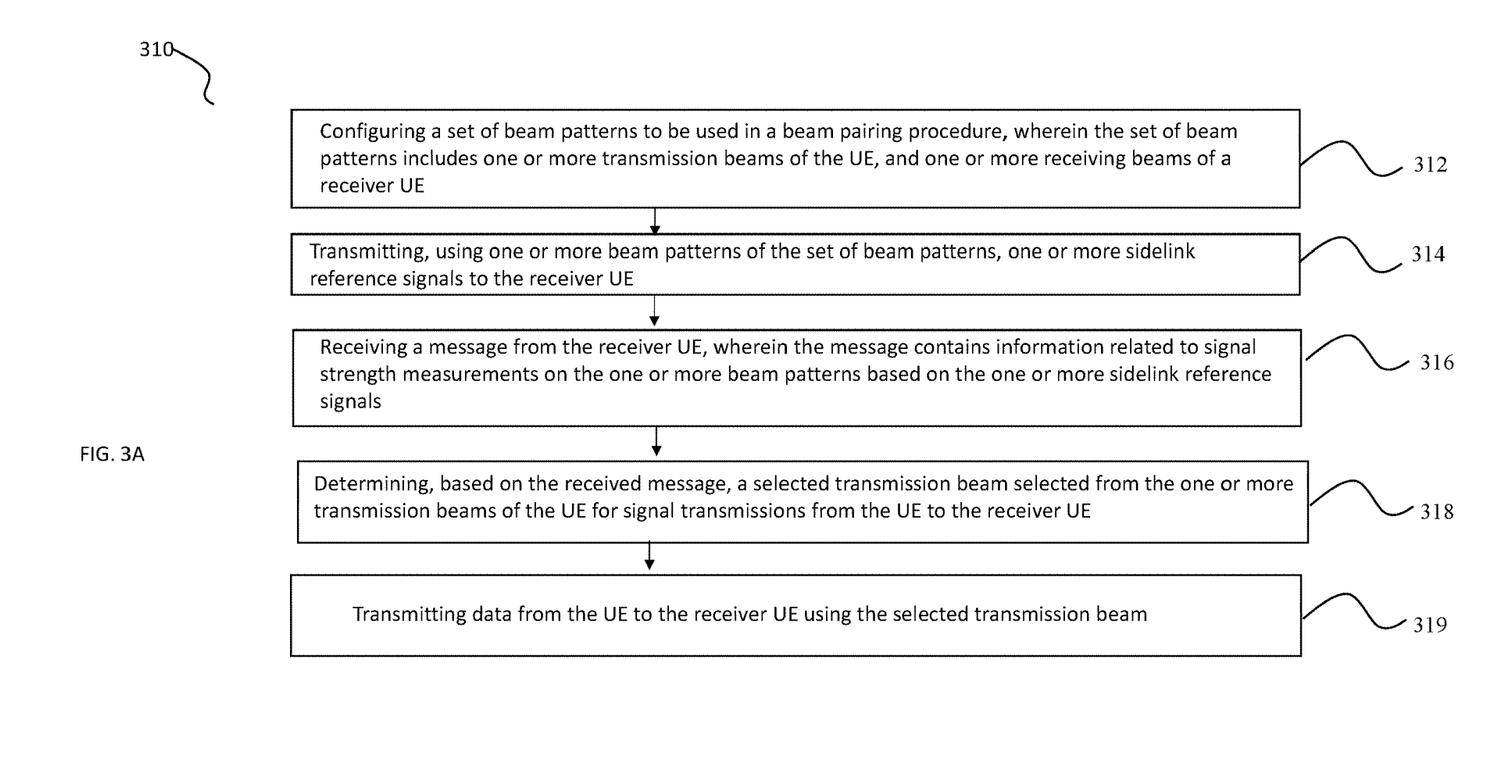
FIGS. 3A-3B illustrate example processes performed by a transmission UE and a receiver UE for a beam pairing procedure for sidelink communications, according to some aspects of the disclosure.
Figure 3B:
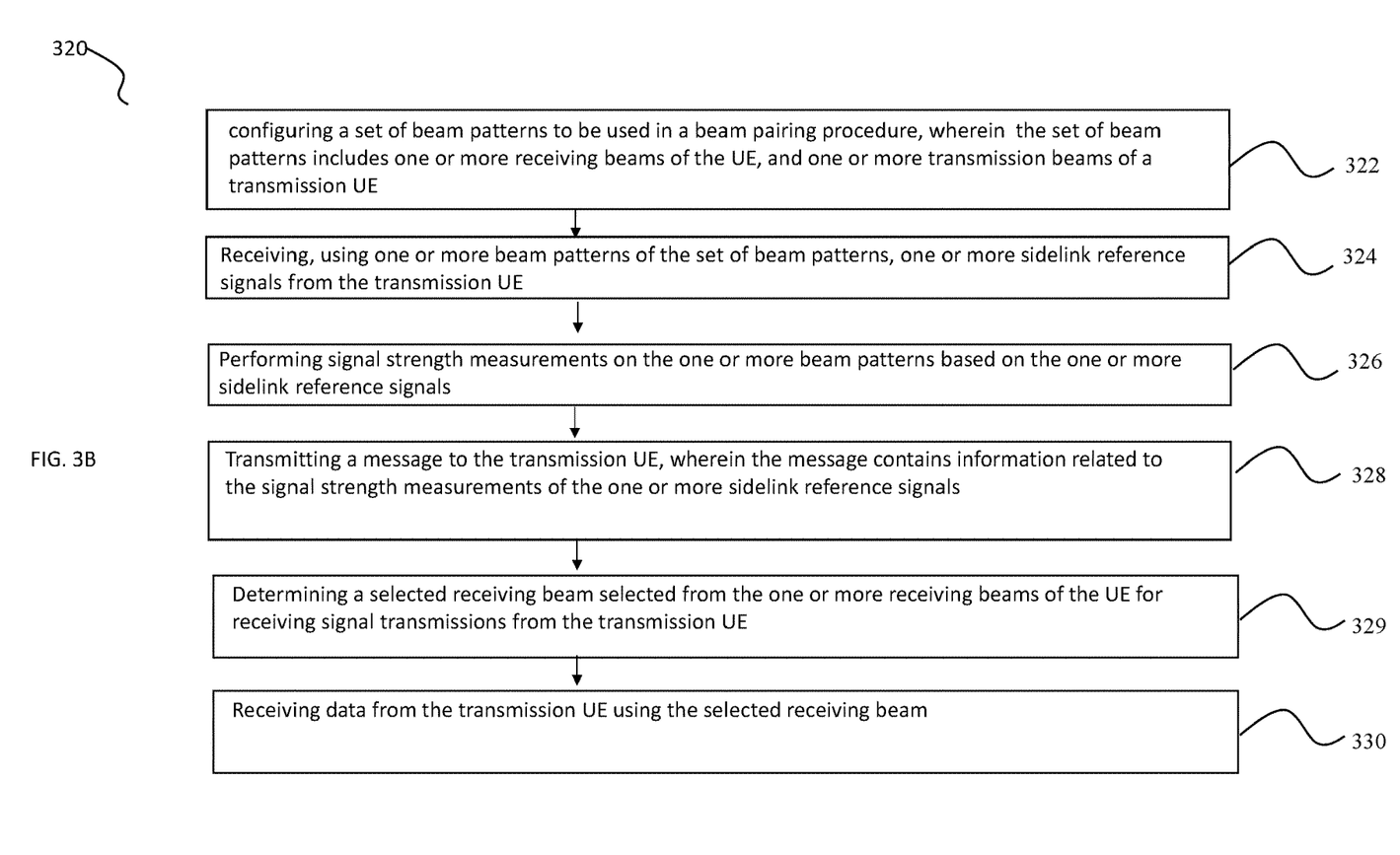

FIGS. 3A-3B illustrate example process 310 and process 320 performed by a transmission UE and a receiver UE to perform a beam pairing procedure for sidelink communications, according to some aspects of the disclosure. Process 310 and process 320 can be performed by UE 102, UE 104, UE 106, or UE 108, which may be implemented as shown in FIG. 2. Process 310 and process 320 may also be performed by a computer system 700 of FIG. 7. Process 310 and process 320 are not limited to the specific aspects depicted in those figures and other systems may be used to perform the method as will be understood by those skilled in the art. It is to be appreciated that not all operations may be needed, and the operations may not be performed in the same order as shown in process 310 and process 320.

Process 310 shown in FIG. 3A describes operations performed by UE 102 when UE 102 functions as a transmission UE, where data communication is transmitted from the transmission UE to a receiver UE such as UE 108.

At 312, processor 133 of UE 102 can configure the set of beam patterns 142 to be used in a beam pairing procedure. For example, the set of beam patterns 142 can be C={(122, 151), (124, 151), (122, 155), (124, 155)}. The set C includes one or more transmission beams of UE 102 (beam 122 and beam 124), and one or more receiving beams (beam 151 and beam 155) of UE 108.

At 314, processor 133 of UE 102 can transmit, using one or more beam patterns of the set of beam patterns, the one or more sidelink reference signals 141 to the receiver UE. In some examples, the one or more sidelink reference signals 141 can include a sidelink channel state information reference signal (CSR-RS). In some examples, the one or more sidelink reference signals 141 can be carried using a physical sidelink shared channel (PSSCH) that carries data information. In some examples, UE 102 can further be configured to receive a beam pairing request from the receiver UE before transmitting the one or more sidelink reference signals 141 to the receiver UE.

At 316, processor 133 of UE 102 can receive message 143 from the receiver UE, which can be UE 108. Message 143 may contain information related to signal strength measurements 144 on the one or more beam patterns based on the one or more sidelink reference signals 141. The signal strength measurements 144 performed on the one or more beam patterns based on the one or more sidelink reference signals 141 can include a Reference Signal Receive Power (RSRP) measurement, a Reference Signal Received Quality (RSRQ), or a Signal to Interference & Noise Ratio (SINR).

At 318, based on the received message 143, processor 133 of UE 102 can further determine a selected transmission beam selected from the one or more transmission beams of UE 102 for signal transmissions from UE 102 to the receiver UE. For example, processor 133 can determine the selected transmission beam to be beam 122 based on one or more transmission beams of UE 102 defined by the set of beam patterns C={(122, 151), (124, 151), (122, 155), (124, 155)}. In some examples, the receiver UE 108 can make a selection for the selected transmission beam, and message 143 received from the receiver UE 108 can contain an identifier of the selected transmission beam selected by the receiver UE 108. In such a situation, processor 133 can determine the selected transmission beam by reading the identifier of the selected transmission beam contained in message 143.

At step 319, processor 133 can transmit data from UE 102 to UE 108 using the selected transmission beam 122.

It will be understood that the transmit and receive operations discussed herein for process 310 can be enabled at least in part by transceiver 131 and/or antenna panel 117.

In some embodiments, to determine the selected transmission beam, processor 133 can select the selected transmission beam of UE 102 and a related receiving beam of the receiver UE based on the information related to the signal strength measurements on the one or more beam patterns based on the one or more sidelink reference signals. Afterwards, processor 133 can transmit an indication to the receiver UE 108 to indicate the selected transmission beam and the related receiving beam of the receiver UE 108. The indication to indicate the selected transmission beam and the related receiving beam includes a quasi-co-location (QCL) indication.

Process 320 shown in FIG. 3B describes operations performed by a receiver UE such as UE 108, where data communication is transmitted from a transmission UE such as UE 102 to UE 108.

At 322, processor 137 of UE 108 can configure the set of beam patterns 142 to be used in a beam pairing procedure, where the set of beam patterns 142 is the same set of beam patterns used to configure the transmission UE such as UE 102.

At 324, processor 137 of UE 108 can receive one or more sidelink reference signals 141 from transmission UE 102. The one or more sidelink reference signals 141 may be carried by a PSSCH that carries data information. In some examples, the one or more sidelink reference signals includes a sidelink (SL) channel state information reference signal (CSR-RS). In some examples, processor 137 of UE 108 can transmit a beam pairing request to the transmission UE 102 before receiving the one or more sidelink reference signals 141 from the transmission UE 102. The transmitting the beam pairing request to the transmission UE 102 can be triggered by a timer or an event, and the beam pairing request can be contained in a MAC CE or in SCI stage 2.

At 326, processor 137 of UE 108 can perform signal strength measurements 144 on the one or more beam patterns based on the one or more sidelink reference signals 141. The signal strength measurements 144 of the one or more sidelink reference signals 141 can include a RSRP measurement, a RSRQ measurement, or a SINR measurement.

At 328, processor 137 of UE 108 can transmit message 143 to the transmission UE 102. Message 143 may contain information related to the signal strength measurements 144 of the one or more sidelink reference signals 141. In some examples, message 143 may be transmitted by a physical sidelink feedback channel (PSFCH).

In some examples, processor 137 of UE 108 can further determine a selected transmission beam selected from the one or more transmission beams of the transmission UE 102. In such examples, message 143 transmitted to the transmission UE 102 can contain an identifier of the selected transmission beam. The identifier of the selected transmission beam can include a slot index, or a resource identifier of the one or more sidelink reference signals.

At 329, processor 137 of UE 108 can determine a selected receiving beam selected from the one or more receiving beams of the UE for receiving signal transmissions from the transmission UE. In some examples, UE 108 can make the selection to determine the selected receiving beam. In some other examples, the transmission UE 102 can make the selection to determine the selected receiving beam. Accordingly, UE 108 can receive a message from the transmission UE 102 that includes an indication of the selected receiving beam selected from the one or more receiving beams of the UE by the transmission UE 102.

At 330, processor 137 of UE 108 can receive data from the transmission UE 102 using the selected receiving beam.

It will be understood that the transmit and receive operations discussed herein for process 320 can be enabled at least in part by transceiver 135 and/or antenna panel 119.

Figure 4A:
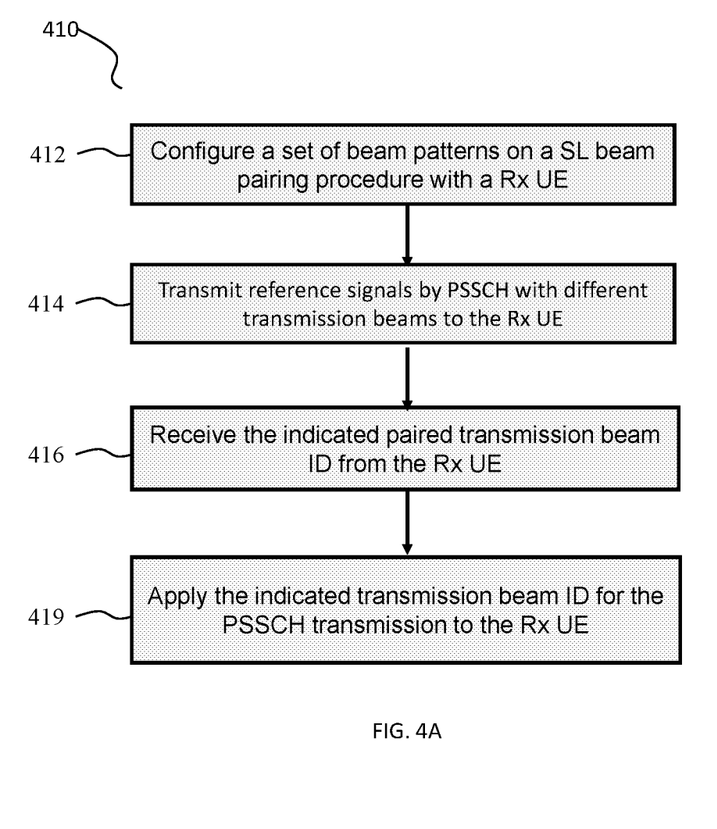
FIGS. 4A-4B illustrate example processes performed by a transmission UE and a receiver UE for a beam pairing procedure for sidelink communications, according to some aspects of the disclosure.
Figure 4B:
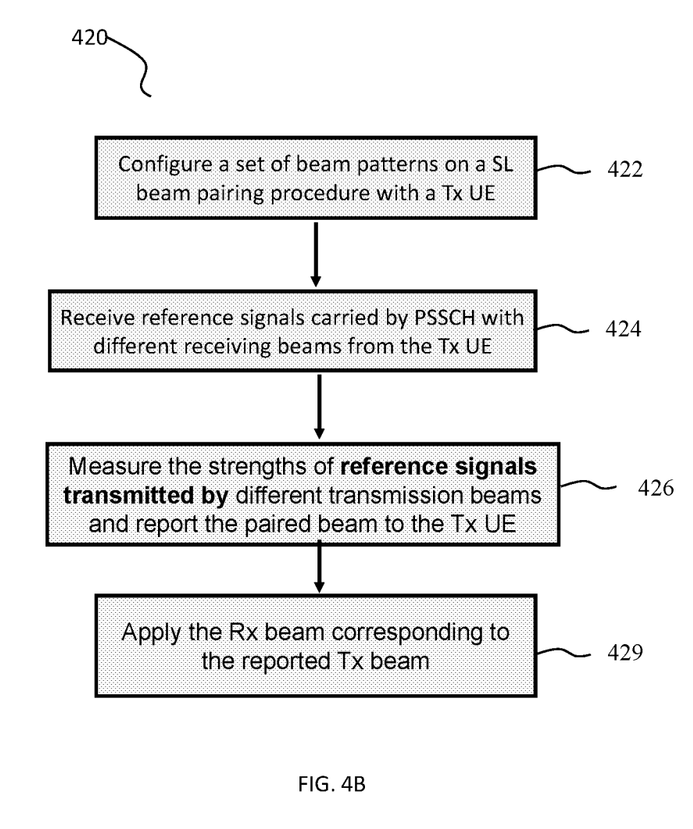

FIGS. 4A-4B illustrate example process 410 and process 420 performed by a transmission UE and a receiver UE for a beam pairing procedure for sidelink communications, according to some aspects of the disclosure.

As shown in FIG. 4A, process 410 can be an implementation and example of process 310, which can be performed by a transmission UE such as UE 102.

At 412, processor 133 of UE 102 can configure the set of beam patterns 142 to be used in a beam pairing procedure with a receiver UE. Operations performed at 412 can be examples of operations performed at 312. The configuration of the set of beam patterns 142 may include configuring various parameters such as a total number of beam transmissions for beam pairing, initial transmission and retransmission, a time window of the beam pairing procedure, and the set of beam pairs to be used in the beam pairing procedure. For example, transport block 1 (TB1) transmission can initially be transmitted with beam 122, and TB1 retransmission can be transmitted with beam 124; transport block 2 (TB2) transmission can initially be transmitted with beam 124, and TB2 retransmission can be transmitted with the same beam 124; TB1 initial transmission and retransmission are both transmitted with beam 122; TB2 initial transmission and retransmission are both transmitted with beam 124; TB1 initial transmission can be transmitted by both beam 122 and beam 124, and TB1 retransmission can be transmitted with beam 124 and beam 126.

At 414, processor 133 of UE 102 can transmit one or more sidelink reference signals by PSSCH with different transmission beams to the receiver UE. Operations performed at 414 can be examples of operations performed at 314. The PSSCH can include SL CSI-RS for RSRP measurement, SCI to indicate the start of the beam pairing procedure. In addition, dummy PSSCH may be used for the beam pairing. The transmission of PSSCH with different beams may be triggered by various mechanisms. For example, PSSCH transmission can be triggered periodically, based on a request from a base station, or based on a detection of an existence of a receiver UE.

At 416, processor 133 of UE 102 can receive from the receiver UE the indicated paired transmission beam identifier (ID) for the transmission beam. Operations performed at 416 can be examples of operations performed at 316 and 318, where the message received contains the ID of the transmission beam. The selection of the transmission beam of UE 102 can be performed by the receiver UE 108. If no transmission beam ID is received from the receiver UE within a certain time, UE 102 can retransmit the one or more sidelink reference signals by PSSCH to the receiver UE. Retransmission of the PSSCH could have same set of beams or different sets of beams from the initial PSSCH transmissions. Certain time gap may be introduced between the PSSCH transmission and PSSCH retransmission for beam pairing.

At 419, processor 133 of UE 102 can transmit a PSSCH data transmission to the receiver UE using the indicated transmission beam ID for the PSSCH data transmission. Optionally, UE 102 may send an acknowledgement (ACK) to the receiver UE 108 to confirm the reception of the transmission beam ID indication from the receiver UE 108.

It will be understood that the transmit and receive operations discussed herein for process 410 can be enabled at least in part by transceiver 131 and/or antenna panel 117.

As shown in FIG. 4B, process 420 can be an implementation or an example of process 320, which can be performed by a receiver UE such as UE 108.

At 422, processor 137 of UE 108 can configure the set of beam patterns 142 to be used in a beam pairing procedure with a transmission UE such as UE 102. Operations performed at 422 can be examples of operations performed at 322, with details described similarly as operations performed at 412 by the transmission UE.

At 424, processor 137 of UE 108 can receive one or more sidelink reference signals carried by PSSCH with different receiving beams from the transmission UE such as UE 102. Operations performed at 424 can be examples of operations performed at 324, with details described similarly as operations performed at 414 by the transmission UE.

At 426, to measure the strength of different transmission beams, processor 137 of UE 108 can perform signal strength measurements 144 of the one or more sidelink reference signals 141. Operations performed at 426 can be examples of operations performed at 326 and at 328. If more than one retransmission uses the same transmission beam, then the averaged RSRP measurement or the later in time RSRP measurement is used for the transmission beam. In some embodiments, PSSCH RSRP or PSCCH RSRP can be measured. In addition, UE 108 can make the selection of the selected transmission beam based on the signal strength measurements 144 on various transmission beams. The selection can be based on configuration, such as resource pool (pre)configuration or PC5-RRC configuration between a pair of UEs.

In some embodiments, processor 137 of UE 108 can further transmit message 143 to the transmission UE 102 to report the selected transmission beam for the UE 102. The message 143 can include various contents. In some embodiments, message 143 can include only the transmission beam ID corresponding to the strongest RSRP (or SINR) measured by UE 108, without a separate RSRP measurement reporting, such as per beam or per PSSCH transmission. The transmission beam ID may be represented by the order of the PSSCH transmission, or represented by the slot index of the corresponding PSSCH transmission (with the strongest RSRP value). Additionally and alternatively, the transmission beam ID may be represented by the CSI-RS resource ID. In some embodiments, message 143 can include multiple transmission beam ID whose signal strength measurements may be stronger than a threshold and which corresponds to the same receiver beam.

In some embodiments, message 143 can be transmitted by a PSFCH transmission corresponding to the last PSCCH/PSSCH transmission for the beam pairing procedure. The PSFCH transmission priority can be (pre)configured per resource pool or based on SL beam pairing configuration. The PSFCH transmission for beam pairing may have a higher priority than PSFCH for SL HARQ or inter-UE coordination. The PSFCH transmission for beam pairing may have a lower priority than PSFCH for SL HARQ or inter-UE coordination. In some embodiments, message 143 can be transmitted by a PSCCH/PSSCH transmission. The PSCCH/PSSCH transmission may follow a legacy resource selection procedure, and packet delay budget (PDB) may be (pre)configured per resource pool or based on SL beam pairing configuration. Similarly, data priority may be (pre)configured per resource pool or based on SL beam pairing configuration.

At 429, processor 137 of UE 108 can receive data using the receiving beam corresponding to the reported transmission beam contained in message 143. In some embodiments, the receiver UE 108 does not need to be informed by the transmission UE 102 for the paired beam, UE 108 can autonomously receive data using the receiving beam corresponding to the reported transmission beam. UE 108 may receive data using the receiving beam at a time instance of some offset after sending the message 143 to UE 102. The offset may be pre-defined or (pre)configured per resource pool or configured during PC5-RRC configuration. In some other embodiments, UE 108 may receive data using the receiving beam corresponding to the reported transmission beam contained in message 143 after receiving an acknowledgement (ACK) message for message 143 to indicate that message 143 has been received. The ACK message can be a SCI stage 2 message to indicate the reception of beam reporting message 143 by UE 102. Additionally and alternatively, the ACK message can be a MAC CE message to indicate the reception of beam reporting message 143 by UE 102. Furthermore, in some embodiments, the ACK message can be sent based on a timer ACK for CG-PUSCH. In some embodiments, a time gap may be applied between beam reporting message 143 being sent and the use of the corresponding receiving beam by UE 108. If the message 143 is sent by a PSSCH transmission, the ACK message to the PSSCH transmission of message 143 can be the slot to receive data using the receiving beam corresponding to the reported transmission beam contained in message 143.

It will be understood that the transmit and receive operations discussed herein for process 420 can be enabled at least in part by transceiver 135 and/or antenna panel 119.

Figure 5A:
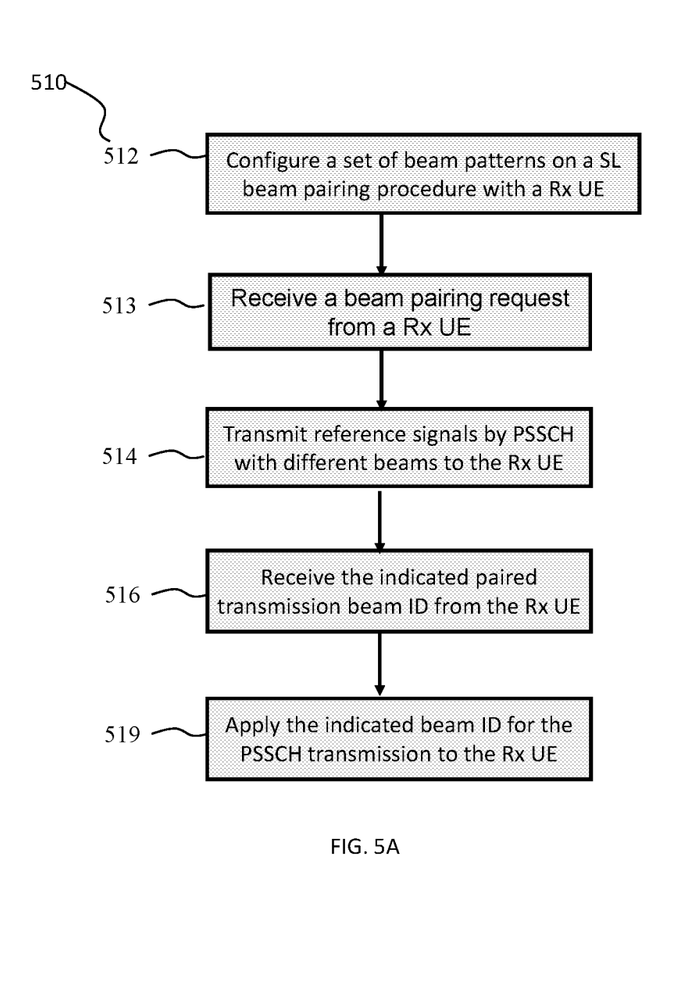
FIGS. 5A-5B illustrate example processes performed by a transmission UE and a receiver UE for a beam pairing procedure for sidelink communications, according to some aspects of the disclosure.
Figure 5B:
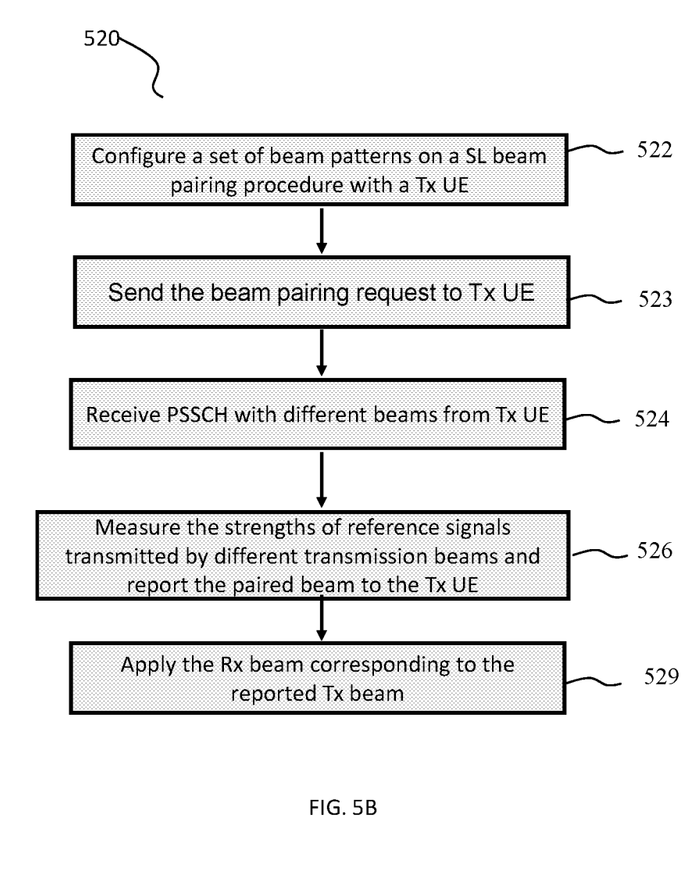

FIGS. 5A-5B illustrate example process 510 and process 520 performed by a transmission UE and a receiver UE for a beam pairing procedure for sidelink communications, according to some aspects of the disclosure.

As shown in FIG. 5A, process 510 can be an implementation of process 310. Previously, process 410 in FIG. 4A shows the one or more sidelink reference signals by PSSCH are sent by the transmission UE 102 without being triggered by a receiving UE. Alternatively, process 510 shows the one or more sidelink reference signals carried by PSSCH are triggered by a request from the receiver UE 108.

At 512, processor 133 of UE 102 can configure the set of beam patterns 142 to be used in a beam pairing procedure. Operations performed at 512 can be examples of operations performed at 312. Details of operations performed at 512 can be similar to details of operations performed at 412.

At 513, processor 133 of UE 102 can receive a beam pairing request from a receiver UE. The request can trigger the transmission UE to send multiple sidelink reference signals repeatedly transmitted with different transmission beams. The beam pairing request can be sent via a SCI stage 2 message, or a MAC CE. The beam pairing request may be triggered based on some events or timer. For example, the beam pairing request may be triggered when several continuous PSSCH decoding failures are detected, when the receiver UE wants to set up the sidelink connection with the transmission UE, when the receiver UE has some sidelink data to be sent to the transmission UE where data priority is higher than a threshold, or some other events.

At 514, processor 133 of UE 102 can transmit, one or more sidelink reference signals by PSSCH with different transmission beams. Operations performed at 514 can be examples of operations performed at 314 with details similar to the details described for operations performed at 414.

At 516, processor 133 of UE 102 can receive from the receiver UE the indicated paired beam ID for the transmission beam. Operations performed at 416 can be examples of operations performed at 316 and 318, where the message received contains the ID of the transmission beam. Operations performed at 516 can have details similar to the details described for operations performed at 416 by the transmission UE 102.

At 519, processor 133 of UE 102 can transmit a PSSCH data transmission to the receiver UE using the indicated transmission beam ID for the PSSCH data transmission. Operations performed at 519 can have details similar to the details described for operations performed at 419 by the transmission UE 102.

It will be understood that the transmit and receive operations discussed herein for process 510 can be enabled at least in part by transceiver 131 and/or antenna panel 117.

As shown in FIG. 5B, process 520 can be an implementation of process 320, which can be performed by a receiver UE such as UE 108. Process 520 shows the one or more sidelink reference signals carried by PSSCH are triggered by a request from the receiver UE 108.

At 522, processor 137 of UE 108 can configure the set of beam patterns 142 to be used in a beam pairing procedure. Operations performed at 522 can be examples of operations performed at 322. Details of operations performed at 522 can be similar to details of operations performed at 422.

At 523, processor 137 of UE 108 can send the beam pairing request to the transmission UE to trigger the transmission UE sending multiple signals repeatedly with different transmission beams. The beam pairing request may be triggered based on some events or timer. For example, the beam pairing request may be triggered when several continuous PSSCH decoding failures are detected, when the receiver UE wants to set up the sidelink connection with the transmission UE, when the receiver UE has some sidelink data to be sent to the transmission UE where data priority is higher than a threshold, or some other events. The beam pairing request can be sent via a SCI stage 2 message, or a MAC CE. The content of the beam pairing request can include the beam patterns to be used to transmit one or more sidelink reference signals, beam pairing starting time, and other parameters. The beam pairing request can have a priority (pre)configured per resource pool.

At 524, processor 137 of UE 108 can receive the one or more sidelink reference signals carried by PSSCH with different transmission beams from the transmission UE. Operations performed at 524 can be examples of operations performed at 324 with details similar to the details described for operations performed at 424.

At 526, processor 137 of UE 108 can perform signal strength measurements 144 of the one or more sidelink reference signals 141, and can further transmit message 143 to the transmission UE 102 to report the selected transmission beam for the UE 102. Operations performed at 526 can be examples of operations performed at 326 and 328, with details similar to the details described for operations performed at 426.

At 529, processor 137 of UE 108 can receive data communication from transmission UE 102 using the receiving beam corresponding to the reported transmission beam contained in message 143. Operations performed at 529 can have details similar to the details described for operations performed at 429.

It will be understood that the transmit and receive operations discussed herein for process 520 can be enabled at least in part by transceiver 135 and/or antenna panel 119.

Figure 6A:
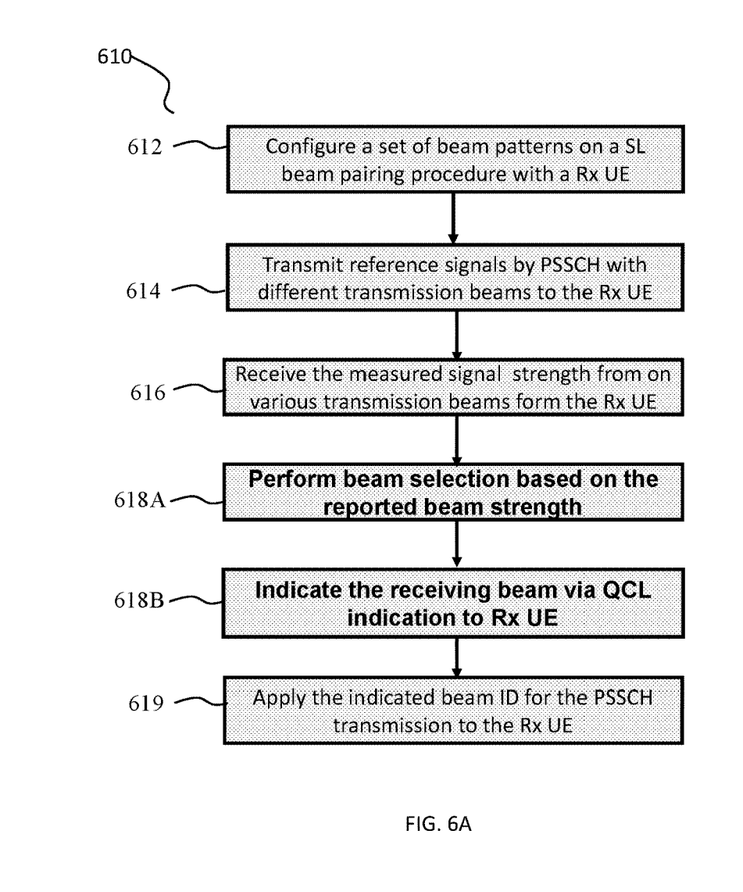
FIGS. 6A-6B illustrate example processes performed by a transmission UE and a receiver UE for a beam pairing procedure for sidelink communications, according to some aspects of the disclosure.
Figure 6B:
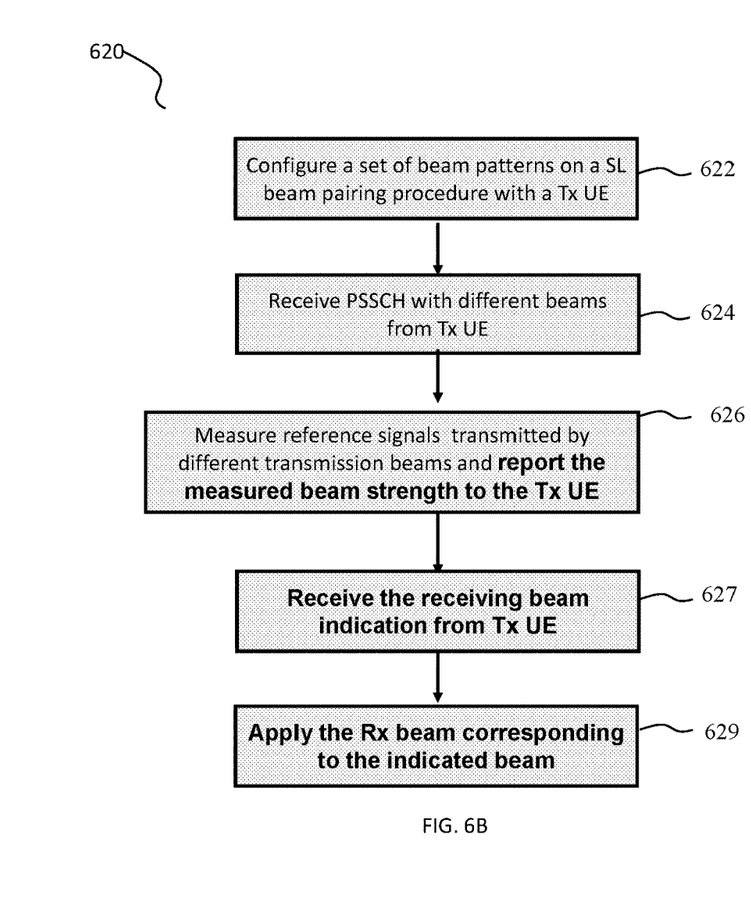

FIGS. 6A-6B illustrate example process 610 and process 620 performed by a transmission UE and a receiver UE for a beam pairing procedure for sidelink communications, according to some aspects of the disclosure.

As shown in FIG. 6A, process 610 can be an implementation of process 310. Previously, in process 410 and process 510, the receiver UE 108 makes the selection of the transmission beam and sends message 143 to transmission UE 102 to indicate the selected transmission beam. Alternatively, process 610 shows the operations performed by transmission UE 102 to make the selection of the transmission beam and potentially the corresponding receiving beam for receiver UE 108.

At 612, processor 133 of UE 102 can configure the set of beam patterns 142 to be used in a beam pairing procedure with a receiver UE. Operations performed at 612 can be examples of operations performed at 312.

At 614, processor 133 of UE 102 transmits one or more sidelink reference signals by PSSCH with different transmission beams to the receiver UE. Operations performed at 614 can be examples of operations performed at 314.

At 616, processor 133 of UE 102 can receive from the receiver UE 108 message 143 containing information related to signal strength measurements on the one or more beam patterns based on the one or more sidelink reference signals. In some example, the receiver UE 108 performs signal strength measurements such as L1-RSRP or L1-SINR measurements. Operations performed at 616 can be examples of operations performed at 316.

At 618A, processor 133 of UE 102 can perform the transmission beam selection to include a Quasi-co-location (QCL) indication. In some embodiments, processor 133 of UE 102 can determine the transmitting beam corresponding to the highest beam strength in the reported beam strengths. In some embodiments, processor 133 of UE 102 can also determine the receiving beam of the receiver UE 108 based on the transmission beam selection. Operations performed at 618A can be examples of operations performed at 318.

At 618B, processor 133 of UE 102 can transmit an indication to the receiver UE 108 to indicate the selected transmission beam and the related receiving beam of the receiver UE 108. Operations performed at 618B can be examples of operations performed at 318. In some embodiments, the indication to indicate the selected transmission beam and the related receiving beam of the receiver UE 108 may be the QCL indication providing a CSI-RS as the source reference signal for QCL-TypeD (spatial Rx parameter) indication. In some embodiments, the QCL indication may be common for multiple channels or dedicated for each channel, e.g. PSSCH, PSCCH, PSFCH and so on. In some embodiments, for PSFCH, the beam indication is to provide a spatial relation indication to determine the transmission beam. The QCL indication may be provided based on transmission configuration indicator (TCI), where the TCI index can be indicated by SCI or MAC CE.

At 619, processor 133 of UE 102 can transmit, a PSSCH data transmission to the receiver UE using the indicated transmission beam ID for the PSSCH data transmission. Operations performed at 619 can have details similar to the details described for operations performed at 419 by the transmission UE 102.

It will be understood that the transmit and receive operations discussed herein for process 610 can be enabled at least in part by transceiver 131 and/or antenna panel 117.

As shown in FIG. 6B, process 620 can be an implementation of process 320. Previously, in process 420 and process 520, the receiver UE 108 makes the selection of the transmission beam and sends message 143 to transmission UE 102 to indicate the selected transmission beam. Alternatively, process 620 shows the operations performed by transmission UE 102 to make the selection of the transmission beam and potentially the corresponding receiving beam for receiver UE 108.

At 622, processor 137 of UE 108 can configure the set of beam patterns 142 to be used in a beam pairing procedure with a receiver UE. Operations performed at 622 can be examples of operations performed at 322.

At 624, processor 137 of UE 108 can receive the one or more sidelink reference signals carried by PSSCH with different transmission beams from the transmission UE. Operations performed at 624 can be examples of operations performed at 324 with details similar to the details described for operations performed at 424.

At 626, processor 137 of UE 108 can perform signal strength measurements 144 of the one or more sidelink reference signals 141, and can further transmit message 143 to the transmission UE 102 to report the selected transmission beam for the UE 102. Operations performed at 626 can be examples of operations performed at 326 and 328, with details similar to the details described for operations performed at 426.

At 627, processor 137 of UE 108 can receive an indication from the transmission UE 102 to indicate the receiving beam of the receiver UE 108 corresponding to a transmission beam selected by UE 102. In some embodiments, the indication to indicate the selected transmission beam and the related receiving beam of the receiver UE 108 may be the QCL indication providing a CSI-RS as the source reference signal for QCL-TypeD (spatial Rx parameter) indication.

At 629, processor 137 of UE 108 can receive data communication from transmission UE 102 using the receiving beam corresponding to the reported transmission beam contained in message 143. Operations performed at 529 can have details similar to the details described for operations performed at 429.

It will be understood that the transmit and receive operations discussed herein for process 620 can be enabled at least in part by transceiver 135 and/or antenna panel 119.

Figure 7:
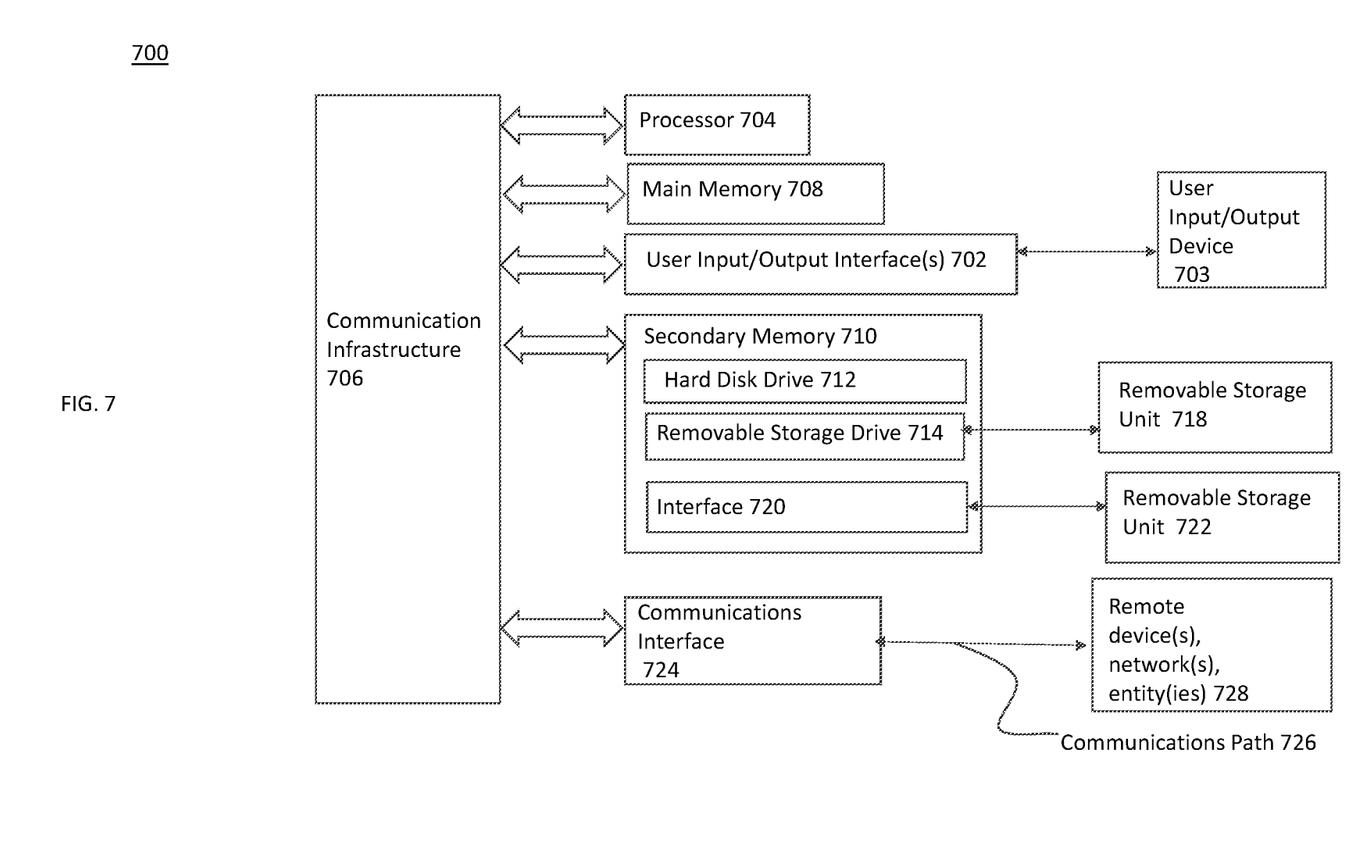
FIG. 7 is an example computer system for implementing some aspects or portion(s) thereof of the disclosure provided herein.

Various aspects can be implemented, for example, using one or more computer systems, such as computer system 700 shown in FIG. 7. Computer system 700 can be any computer capable of performing the functions described herein such as UE 102, UE 103, UE 104, UE 106, UE 108 in in FIG. 1. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 708, the removable storage unit 718, the removable storage unit 722 can store instructions that, when executed by processor 704, cause processor 704 to perform operations for a UE, e.g., UE 102, UE 103, UE 104, UE 106, UE 108 in FIG. 1. In some examples, the operations can include operations described in FIGS. 3A-3B, FIGS. 4A-4B, FIGS. 5A-5B, or FIGS. 6A-6B.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both.

In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a UE, base station, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
a transceiver configured to wirelessly enable sidelink communication with one or more UEs including a receiver UE; and
a processor communicatively coupled to the transceiver and configured to:
configure a set of beam patterns to be used in a beam pairing procedure, wherein the set of beam patterns includes one or more transmission beams of the UE and one or more receiving beams of the receiver UE, wherein the set of beam patterns is a smaller subset of all possible N*M beam pairs that can be formed by N transmission beams available to the UE and M receive beams available to the receiver UE;
transmit, using one or more beam patterns of the set of beam patterns, one or more sidelink reference signals to the receiver UE;
receive a message from the receiver UE, wherein the message contains information related to signal strength measurements performed on the one or more beam patterns and based on the one or more sidelink reference signals;
determine, based on the received message, a selected transmission beam selected from the one or more transmission beams of the UE for signal transmissions from the UE to the receiver UE.

2. The UE of claim 1, wherein the one or more sidelink reference signals are carried using a physical sidelink shared channel (PSSCH) that carries data information.

3. The UE of claim 1, wherein the one or more sidelink reference signals includes a sidelink (SL) channel state information reference signal (CSR-RS), and the signal strength measurements performed on the one or more beam patterns and based on the one or more sidelink reference signals include a Reference Signal Receive Power (RSRP) measurement, a Reference Signal Received Quality (RSRQ), or a Signal to Interference & Noise Ratio (SINR).

4. The UE of claim 1, wherein the message received from the receiver UE contains an identifier of the selected transmission beam selected by the receiver UE.

5. The UE of claim 1, wherein the processor is further configured to:
receive a beam pairing request from the receiver UE before transmitting the one or more sidelink reference signals to the receiver UE.

6. The UE of claim 1, wherein the message received from the receiver UE contains the information related to the signal strength measurements performed on the one or more beam patterns and based on the one or more sidelink reference signals, and to determine the selected transmission beam, the processor is configured to:
select the selected transmission beam of the UE and a related receiving beam of the receiver UE based on the information related to the signal strength measurements on the one or more beam patterns based on the one or more sidelink reference signals.

7. The UE of claim 6, wherein the processor is further configured to:
transmit an indication to the receiver UE to indicate the selected transmission beam and the related receiving beam of the receiver UE.

8. The UE of claim 7, wherein the indication to indicate the selected transmission beam and the related receiving beam includes a quasi-co-location (QCL) indication.

9. The UE of claim 1, wherein the processor is further configured to:
transmit data from the UE to the receiver UE using the selected transmission beam.

10. A method performed by a user equipment (UE), comprising:
configuring a set of beam patterns to be used in a beam pairing procedure, wherein the set of beam patterns includes one or more receiving beams of the UE and one or more transmission beams of a transmission UE, wherein the set of beam patterns is a smaller subset of all possible N*M beam pairs that can be formed by N transmission beams available to the transmission UE and M receive beams available to the UE;
receiving, using one or more beam patterns of the set of beam patterns, one or more sidelink reference signals from the transmission UE;
performing signal strength measurements on the one or more beam patterns based on the one or more sidelink reference signals;
transmitting a message to the transmission UE, wherein the message contains information related to the signal strength measurements of the one or more sidelink reference signals; and
determining a selected receiving beam selected from the one or more receiving beams of the UE for receiving signal transmissions from the transmission UE.

11. The method of claim 10, wherein the receiving the one or more sidelink reference signals from the transmission UE comprises receiving the one or more sidelink reference signals by a physical sidelink shared channel (PSSCH) that carries data information.

12. The method of claim 10, wherein the transmitting the message to the transmission UE comprises transmitting the message by a physical sidelink feedback channel (PSFCH).

13. The method of claim 10, wherein the one or more sidelink reference signals includes a sidelink (SL) channel state information reference signal (CSR-RS), and the signal strength measurements performed on the one or more beam patterns based on the one or more sidelink reference signals include a Reference Signal Receive Power (RSRP) measurement, a Reference Signal Received Quality (RSRQ), or a Signal to Interference & Noise Ratio (SINR).

14. The method of claim 10, further comprising:
determining a selected transmission beam selected from the one or more transmission beams of the transmission UE, wherein the message transmitted to the transmission UE contains an identifier of the selected transmission beam.

15. The method of claim 14, wherein the identifier of the selected transmission beam includes a slot index, or a resource identifier of the one or more sidelink reference signals.

16. The method of claim 10, further comprising:
transmitting a beam pairing request from the UE before receiving the one or more sidelink reference signals from the transmission UE.

17. The method of claim 16, wherein the transmitting the beam pairing request is triggered by a timer or an event, and the beam pairing request is contained in a medium access control (MAC) control element (CE) or Sidelink Control Information (SCI) stage 2.

18. The method of claim 10, wherein the message transmitted to the transmission UE contains the information related to the signal strength measurements, the method further comprising:
receiving a message from the transmission UE that includes an indication of the selected receiving beam selected from the one or more receiving beams of the UE by the transmission UE.

19. A method for a user equipment (UE), comprising:
configuring a set of beam patterns to be used in a beam pairing procedure, wherein the set of beam patterns includes one or more transmission beams of the UE and one or more receiving beams of a receiver UE, wherein the set of beam patterns is a smaller subset of all possible N*M beam pairs that can be formed by N transmission beams available to the UE and M receive beams available to the receiver UE;
transmitting, using one or more beam patterns of the set of beam patterns, one or more sidelink reference signals to the receiver UE;
receiving a message from the receiver UE, wherein the message contains information related to signal strength measurements performed on the one or more beam patterns and based on the one or more sidelink reference signals; and
determining, based on the received message, a selected transmission beam selected from the one or more transmission beams of the UE for signal transmissions from the UE to the receiver UE.

20. The method of claim 19, wherein the one or more sidelink reference signals are carried using a physical sidelink shared channel (PSSCH) that carries data information.

* * * * *